US008166009B2

(12) United States Patent
Dunn (10) Patent No.: US 8,166,009 B2
(45) Date of Patent: Apr. 24, 2012

(54) METHOD AND APPARATUS FOR OPTIMISTIC LOCKING USING SQL SELECT, UPDATE, DELETE, AND INSERT STATEMENTS

(75) Inventor: Robert Michael Hunter Dunn, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 12/751,564

(22) Filed: Mar. 31, 2010

(65) Prior Publication Data
US 2010/0185597 A1    Jul. 22, 2010

Related U.S. Application Data

(62) Division of application No. 11/340,995, filed on Jan. 27, 2006, now Pat. No. 7,702,658.

(51) Int. Cl.
*G06F 7/00* (2006.01)
*G06F 17/00* (2006.01)
(52) U.S. Cl. ........................................ 707/704
(58) Field of Classification Search .............. 707/687, 707/704
See application file for complete search history.

(56) References Cited

U.S. PATENT DOCUMENTS

| 5,499,356 | A | 3/1996 | Eckert et al. |
|---|---|---|---|
| 5,519,859 | A | 5/1996 | Grace |
| 5,560,007 | A | 9/1996 | Thai |
| 5,742,813 | A | 4/1998 | Kavanagh et al. |
| 5,870,743 | A | 2/1999 | Cohen et al. |
| 5,870,765 | A | 2/1999 | Bauer et al. |
| 5,887,181 | A | 3/1999 | Volkonsky |
| 5,960,438 | A | 9/1999 | Chang et al. |
| 6,128,588 | A | 10/2000 | Chacon |
| 6,189,010 | B1 | 2/2001 | Isip |
| 6,240,413 | B1 | 5/2001 | Learmont |
| 6,243,709 | B1 | 6/2001 | Tung |
| 6,401,103 | B1 | 6/2002 | Ho et al. |
| 6,457,021 | B1 | 9/2002 | Berkowitz et al. |

(Continued)

OTHER PUBLICATIONS

Sunderraman, "Oracle Programming: A Primer", Addison-Wesley, Reading, Massachusetts, Oct. 1998, 8 pages.
USPTO Notice of Allowance dated Dec. 4, 1999 for U.S. Appl. No. 11/340,995.
USPTO Office Action dated Nov. 23, 2007 for U.S. Appl. No. 11/340,995.

(Continued)

*Primary Examiner* — Marc Somers
(74) *Attorney, Agent, or Firm* — Yee & Associates, P.C.; Terrance J. Carroll (57) ABSTRACT

A method, computer program product and data processing system for optimistic locking. An integer column is added to a database table. A Structured Query Language statement is constructed and prepared to form a prepared Structured Query Language statement, wherein a result set of the prepared Structured Query Language statement includes the integer column. Any required parameter information is set in the prepared Structured Query Language statement. The prepared Structured Query Language statement is executed in a database transaction. A unique key associated with an element of the result set of the prepared Structured Query Language statement is determined. The row of the database table that the unique key is associated with is determined. A value in the integer column of the determined row is determined. The value in the integer column of the determined row is stored to form a stored value associated with the unique key, wherein the stored value ceases to exist when the database transaction ends.

6 Claims, 8 Drawing Sheets

U.S. PATENT DOCUMENTS

| | | |
|---|---|---|
| 6,574,636 B1 | 6/2003 | Balon et al. |
| 6,606,618 B2 | 8/2003 | Delo |
| 6,714,943 B1 * | 3/2004 | Ganesh et al. ............... 707/104 |
| 6,850,938 B1 | 2/2005 | Sadjadi |
| 6,993,770 B1 | 1/2006 | Detlefs et al. |
| 7,107,237 B2 | 9/2006 | Liu et al. |
| 7,484,087 B2 | 1/2009 | Doddington |
| 7,702,658 B2 | 4/2010 | Dunn |
| 2001/0007986 A1 | 7/2001 | Hara et al. |
| 2002/0099559 A1 | 7/2002 | Liu et al. |
| 2003/0233356 A1 | 12/2003 | Dean et al. |
| 2004/0167878 A1 | 8/2004 | Doddington |
| 2005/0097561 A1 | 5/2005 | Schumacher et al. |
| 2005/0138375 A1 | 6/2005 | Sadjadi |
| 2006/0136422 A1 | 6/2006 | Matveief et al. |
| 2007/0038618 A1 | 2/2007 | Kosciusko et al. |

OTHER PUBLICATIONS

USPTO Office Action dated May 28, 2008 for U.S. Appl. No. 11/340,995.

USPTO Office Action dated Feb. 13, 2009 for U.S. Appl. No. 11/340,995.

USPTO Final Office Action dated Aug. 27, 2008 for U.S. Appl. No. 11/340,995.

USPTO Final Office Action dated Aug. 3, 2009 for U.S. Appl. No. 11/340,995.

* cited by examiner

METHOD AND APPARATUS FOR OPTIMISTIC LOCKING USING SQL SELECT, UPDATE, DELETE, AND INSERT STATEMENTS

This application is a divisional of prior application Ser. No. 11/340,995, filed Jan. 27, 2006, now U.S. Pat. No. 7,702,658.

BACKGROUND OF THE INVENTION

1. Field of the Invention

The present invention relates generally to a data processing system. More specifically, the present invention provides a computer implemented method, computer program product, and data processing system for optimistic locking using SQL SELECT, UPDATE, DELETE, and INSERT statements.

2. Description of the Related Art

Optimistic Locking is a well-known Structured Query Language (SQL) programming technique used to maintain data integrity in a relational database within the scope of a database transaction without having simple read operations blocking write operations. The technique is generally described as including data obtained using a previously executed (in the same transaction) SELECT statement in the WHERE clause of an UPDATE statement in such a way that an intervening change (made by another concurrently executing program) in the row being updated would prevent the UPDATE statement from updating the row. When such an update is so prevented, the database transaction is rolled back and an appropriate recovery action is taken, for example, retrying the rolled back transaction.

It is often not practical to include in the WHERE clause values for all the columns whose data could possible change. Therefore, an optimistic locking technique that does not include in the WHERE clause all columns whose data could possibly change must arrange it so that whenever any of the data in any of the columns changes, at least one data value in the WHERE clause also changes. One technique that may be used to achieve this, that is obvious to one of ordinary skill in the art and used in this disclosure, is to define a new column, referred to as the OPTCOUNTER column in this disclosure, and to include that column in the WHERE clause, and to arrange that whenever any data value is changed the OPTCOUNTER value is also changed.

Additionally, this technique does not solve problems that arise when a DELETE operation followed by an INSERT operation is performed in the same database transaction. In order to maintain data integrity, this situation needs to be handled in such a way that a concurrent attempt to change the row being deleted and re-inserted can detect that the row has been changed since it was read, and can cause its transaction to be rolled back.

Furthermore, this technique does not address the case of an INSERT operation. Typically, constant values are assigned to columns whose values will be included in WHERE clauses of Optimistic SQL statements. Thus a problem arises when a DELETE of a row containing those constant values is followed by an INSERT in the same transaction. The problem is that the values in the deleted rows are not known and cannot be remembered so they will not be used in the INSERT statement. Thus data integrity is much more likely to be compromised since a concurrent attempt to change the row being deleted and re-inserted cannot detect that the row has been changed since it was read.

BRIEF SUMMARY OF THE INVENTION

The present invention provides a method, computer program product and data processing system for optimistic locking. An integer column is added to a database table. A Structured Query Language statement is constructed and prepared to form a prepared Structured Query Language statement, wherein a result set of the prepared Structured Query Language statement includes the integer column. Any required parameter information is set in the prepared Structured Query Language statement. The prepared Structured Query Language statement is executed in a database transaction. A unique key associated with an element of the result set of the prepared Structured Query Language statement is determined. The row of the database table that the unique key is associated with is determined. A value in the integer column of the determined row is determined. The value in the integer column of the determined row is stored to form a stored value associated with the unique key, wherein the stored value ceases to exist when the database transaction ends.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer useable or readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention provides a computer implemented method, data processing system, and computer program product for optimistic locking using SQL SELECT, UPDATE, DELETE, and INSERT statements.

Figure 1:
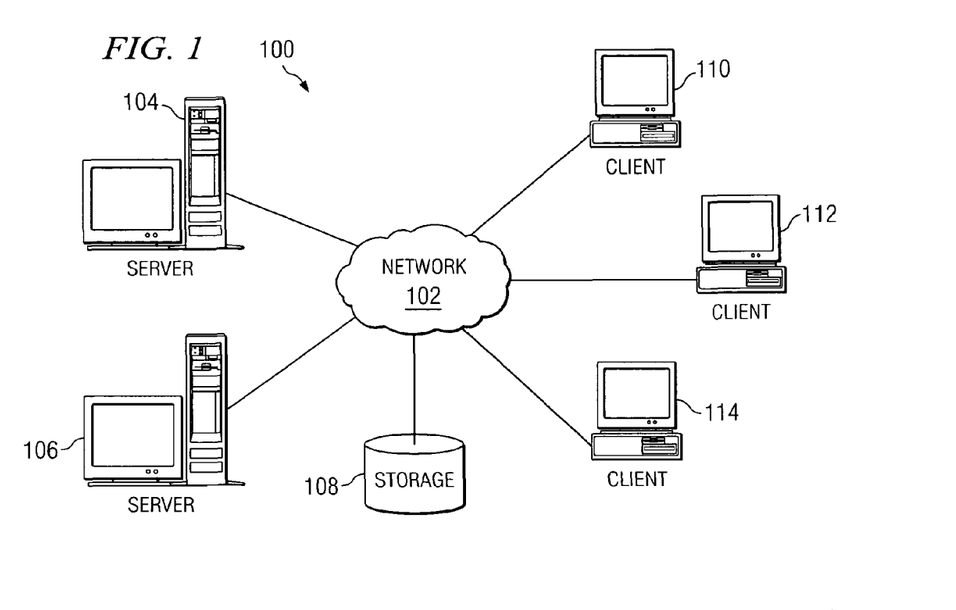
FIG. 1 is a pictorial representation of a network of data processing systems in which exemplary aspects of the present invention may be implemented.
Figure 2:
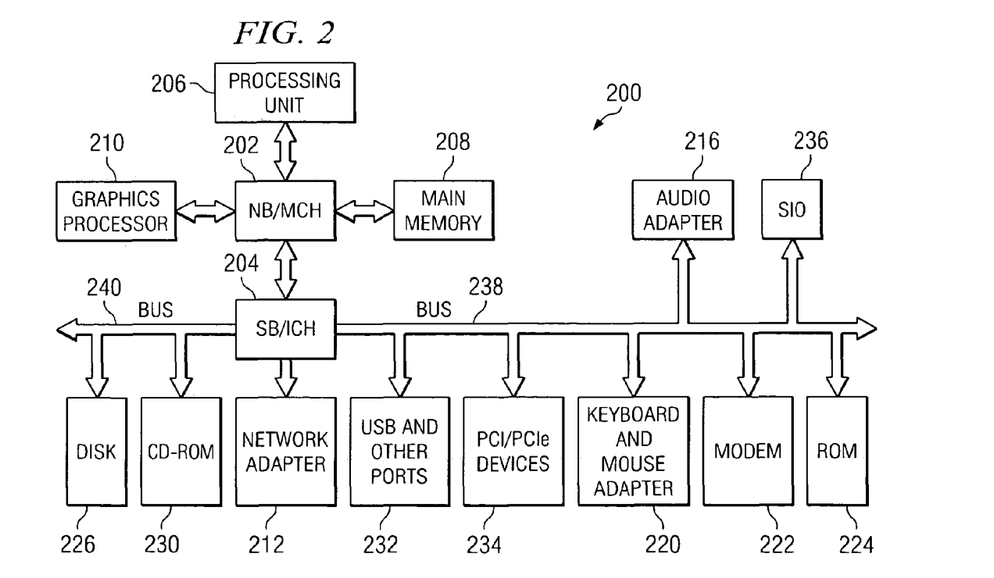
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
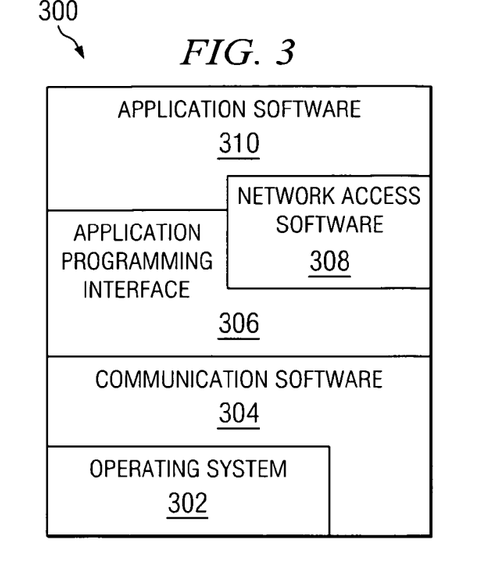
FIG. 3 is a block diagram depicting typical software architecture for a server-client system in which exemplary aspects of the present invention may be implemented.

Turning to FIG. 3, typical software architecture for a server-client system, generally denoted by reference number 300, is depicted in which exemplary aspects of the present invention may be implemented. At the lowest level, operating system 302 is utilized to provide high-level functionality to the user and to other software. Such an operating system typically includes a basic input/output system (BIOS). Communication software 304 provides communications through an external port to a network such as the Internet via a physical communication links by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Application software 310 represents any number of software applications designed to react to data through the communications port to provide the desired functionality the user seeks. Applications at this level may include those necessary to handle data, video, graphics, photos or text, which can be accessed by users of the Internet.

In order to achieve Optimistic Locking, an integer column, called OPTCOUNTER, is added to each database table. The convention used to implement Optimistic Locking is that a change in the value of this column for a row in a table indicates that the row has been changed.

In an exemplary embodiment of the present invention, a programming class, called OptCounterInfo in this disclosure, is defined to remember the value of the OPTCOUNTER column for each row of each table read while a database transaction is active, and to provide SQL fragments to be used in the construction of SQL SELECT, UPDATE, DELETE, and INSERT statements to be executed.

Data integrity is improved because all SELECT, UPDATE, DELETE, and INSERT statements can be constructed to participate correctly in the Optimistic Locking scheme, whereby concurrent changes are prevented. This is an advantage over schemes that only prevent concurrent updates via UPDATE statements.

In the case where rows are deleted without remembering their column values and later some of the rows are re-inserted during the same transaction, data integrity is improved because values are randomly assigned to the OPTCOUNTER column in the re-inserted rows. As new values are assigned to the OPTCOUNTER column when the rows are re-inserted, there is a chance that the new value is the same as the old value and therefore the program does not realize that the data has changed. Therefore, assigning a random value to the OPTCOUNTER column in the re-inserted rows produces a smaller chance that the randomly assigned value is the same as the original value of the deleted row.

Business programming logic is simplified because the information needed to properly construct SQL statements is encapsulated in the OptCounterInfo class, which is only used during the construction and execution of the SQL and does not need to be known by higher level business logic. This is an advantage over schemes that require the data in the over-qualified WHERE clause to be known by the business logic and passed to the SQL construction and execution methods. An over-qualified WHERE clause is a WHERE clause that contains an extra qualification. If the following SQL WHERE clause uniquely determines a row in the data base table, WHERE KEY=123, then the following SQL WHERE clause is "over qualified" with the OPTCOUNTER information, WHERE KEY=123 AND OPTCOUNTER=456.

The OptCounterInfo class maintains a map in each concurrently executing program execution thread. Each map is cleared immediately after a database transaction is started, and immediately after a database transaction is committed or rolled back. Each map element is a mapping from a unique key that uniquely identifies a database row to an instance of the OptCounterInfo class.

Each OptCounterInfo instance contains properties reflecting information about the value of the OPTCOUNTER column in the uniquely identified row. The information is reflected in the properties known as "Known," "Null," and "Value." The Known property is a boolean property indicating whether the OPTCOUNTER column value is known; for example, because it has been read from the database during the current transaction, or because a row has been or will be updated or inserted with this value. The Null property is a boolean property indicating whether the value of the OPTCOUNTER column is NULL, which has meaning only if the value of the OPTCOUNTER column is known. The Value property is the integer value of the OPTCOUNTER column, which has meaning only if the value of the OPTCOUNTER column is known and not NULL.

Additionally, an instance of the OptCounterInfo class has an internal boolean property that is initially false and becomes true when either the increment or randomize method is called. This information is used by methods that provide SQL fragments, since once a row has been updated or inserted a database write lock has been obtained and will be held until the end of the transaction and thus over-qualification of the WHERE clause is no longer required nor is further incrementing of the OPTCOUNTER column value required during the remainder of the transaction.

In an exemplary embodiment of the present invention, an instance of OptCounterInfo provides the following methods: setCurrentValue(resultSet), getCurrentValue( ), increment( ), randomize( ), getWhereClauseFragment( ), and setParameter (preparedStatement,index). The setCurrentValue(resultSet) method extracts the OPTCOUNTER value from the specified SQL query result and sets the Value and Null properties appropriately. The setCurrentValue(resultSet) method also sets the Known property to true. The getCurrentValue( ) method returns the value of the Value property. The increment( ) method increments the Value property by one. If incrementing the Value property would cause an overflow, the Value property is instead set to one. The Null property is set to false. Calling this method indicates that the incremented value is about to be updated in or inserted into the corresponding database row. The randomize( ) method assigns a randomly generated value to the Value property. The Null property is set to false. Calling this method indicates that the random value is about to be updated in or inserted into the corresponding database row. The getWhereClauseFragment( ) method returns an empty string if the increment or randomize methods have been called during the current transaction. Otherwise it returns "AND OPTCOUNTER IS NULL" if the Null property is true, or "AND OPTCOUNTER=?" if the Null property is false. The question mark is called a "parameter marker". The setParameter(preparedStatement, index) method sets the actual OPTCOUNTER value into a prepared SQL statement. If the Known property is true, and the Null property is false, and neither the increment nor the randomize methods has been called, the value of the Value property is set in the specified prepared SQL statement according to the specified index.

In an exemplary embodiment of the present invention, the OptCounterInfo class provides the following methods: getSavedOptCounterInfo(key), getSavedOptCounterInfoForInsert(key), and getIncrementOptCounterFragment( ). The getSavedOptCounterInfo(key) method returns an instance of OptCounterInfo for the specified unique key. If the instance is not found in the map, then a new instance is created and placed in the map, with the Known property set to false. The getSavedOptCounterInfoForInsert(key) method returns the instance that would be returned by a call to the getSavedOptCounterInfo(key) method, but additionally calls the increment method if the Known property is true, or otherwise calls the randomize method if the Known property is false. Calling this method indicates that the specified row will be updated in or inserted into the database table with the returned incremented or randomized OPTCOUNTER value. The getIncrementOptCounterFragment( ) method returns a constant string that can be used to increment the OPTCOUNTER column value in an existing database table row. This method encapsulates the knowledge of how to increment the OPTCOUNTER column value, which may be different depending on the variation of SQL used by the database program, thus allowing the business logic that constructs the SQL statement to be database vendor neutral in this regard. Additionally, if the incremented value would exceed the capacity of the OPTCOUNTER column or if the value is a NULL, the value is instead set to a specific, sufficiently small value that does not exceed the capacity of the OPTCOUNTER column. In an exemplary embodiment of the present invention, the value is set to one if either the value exceeds the capacity of the OPTCOUNTER column or the value is a NULL. The OptCounterInfo class is used to construct and execute SQL SELECT, UPDATE, DELETE, and INSERT statements.

Figure 4:
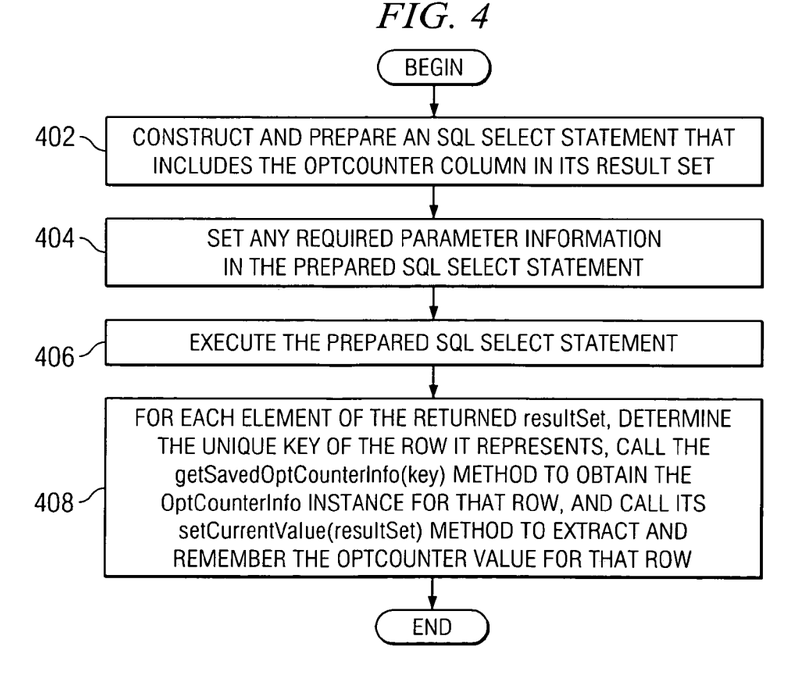
FIG. 4 is a flowchart illustrating the operation of a method to construct and execute a SELECT statement that remembers OPTCOUNTER values for subsequent Optimistic SQL statements, in accordance with an exemplary embodiment of the present invention.

Turning now to FIG. 4, FIG. 4 is a flowchart illustrating the operation of a method to construct and execute a SELECT statement that remembers OPTCOUNTER values for subsequent Optimistic SQL statements, in accordance with an exemplary embodiment of the present invention. The operation begins by constructing and preparing an SQL SELECT statement that includes the OPTCOUNTER column in its result set (step 402). Then, if the SQL SELECT statement contains parameter markers, the operation sets any required parameter information in the prepared SQL SELECT statement (step 404). Next the operation executes the prepared SQL SELECT statement (step 406). Then, for each element of the returned resultSet, the operation determines the unique key of the row it represents, calls the getSavedOptCounterInfo(key) method to obtain the OptCounterInfo instance for that row, and calls its setCurrentValue(resultSet) method to extract and remember the OPTCOUNTER value for that row (step 408) and the operation ends. Performing these steps is a precursor that allows for the performance of other methods involving Optimistic statements.

Figure 5:
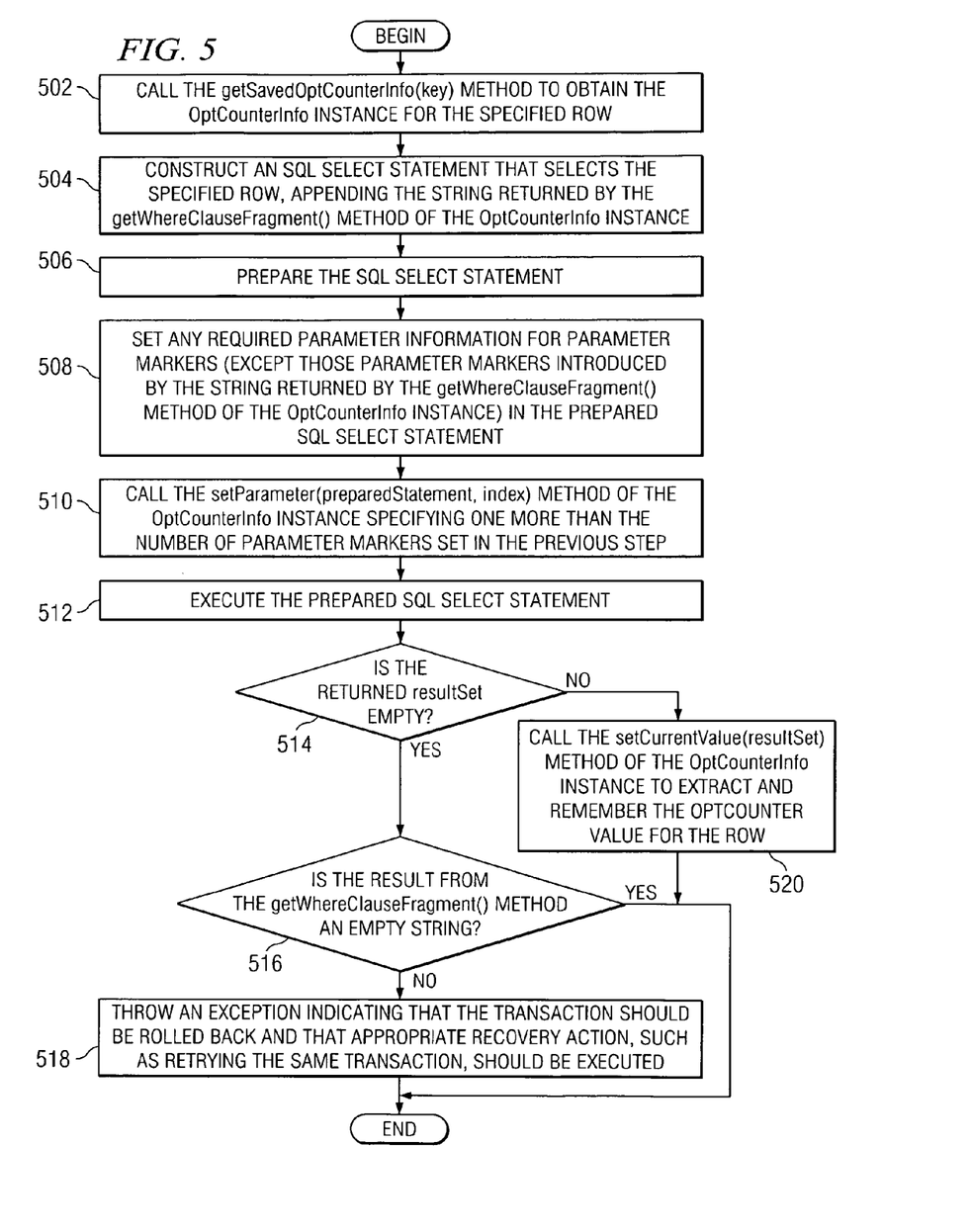
FIG. 5 is a flowchart illustrating a method to construct and execute an Optimistic SELECT statement, in accordance with an exemplary embodiment of the present invention.

FIG. 5 is a flowchart illustrating a method to construct and execute an Optimistic SELECT statement, in accordance with an exemplary embodiment of the present invention. An Optimistic SELECT statement selects a single row and fails if the OPTCOUNTER value has changed since the row was most recently read or updated in the same transaction. The operation begins by calling the getSavedOptCounterInfo (key) method to obtain the OptCounterInfo instance for the specified row (step 502). The operation constructs an SQL SELECT statement that selects the specified row, appending the string returned by the getWhereClauseFragment( ) method of the OptCounterInfo instance (step 504). Then the operation prepares the SQL SELECT statement (step 506). The operation sets any required parameter information for parameter markers, except for those parameter markers introduced by the string returned by the getWhereClauseFragment( ) method of the OptCounterInfo instance, in the prepared SQL SELECT statement (step 508). Then the operation calls the setParameter(preparedStatement, index) method of the OptCounterInfo instance specifying one more than the number of parameter markers set in the previous step (step 510). Next, the operation executes the prepared SQL SELECT statement (step 512). The operation determines if the returned resultSet is empty (step 514). If the returned resultSet is not empty (a no output to step 514), then the operation calls the setCurrentValue(resultSet) method of the OptCounterInfo instance to extract and remember the OPTCOUNTER value for the row (step 520) and the method ends. If the returned resultSet is empty (a yes output to step 514), the operation determines if the result from the getWhereClauseFragment( ) method was an empty string (step 516). If the result from the getWhereClauseFragment( ) method was not an empty string (a no output to step 516), then the operation throws an exception indicating that the transaction should be rolled back and that appropriate recovery action, such as retrying the same transaction, should be executed (step 518) and the operation ends. If the result from the getWhereClauseFragment( ) method was an empty string (a yes output to step 516), then the operation ends.

Figure 6:
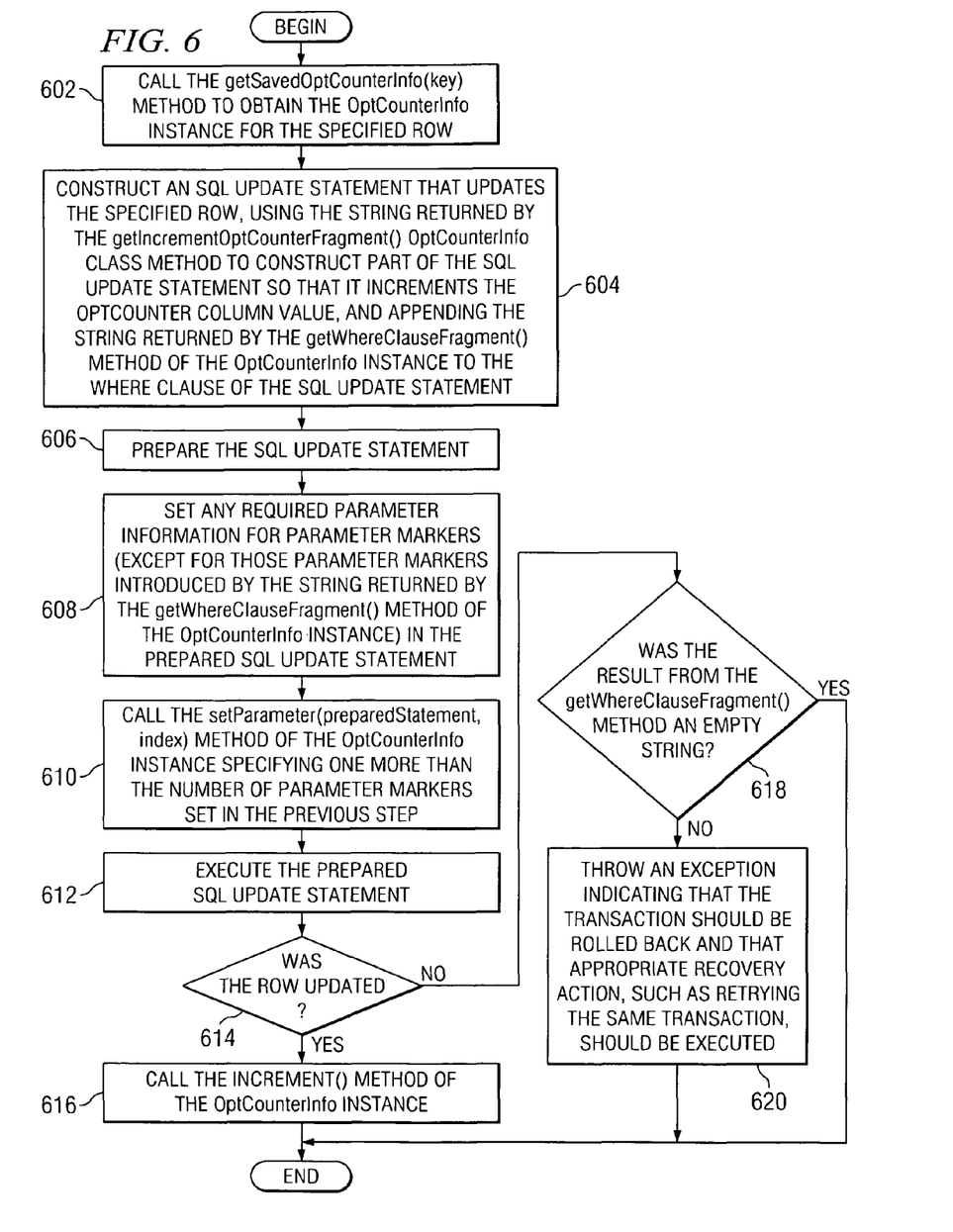
FIG. 6 is a flowchart illustrating a method to construct and execute an Optimistic UPDATE statement, in accordance with an exemplary embodiment of the present invention.

FIG. 6 is a flowchart illustrating a method to construct and execute an Optimistic UPDATE statement, in accordance with an exemplary embodiment of the present invention. An Optimistic UPDATE statement updates a single row and fails if the OPTCOUNTER value has changed since the row was most recently read or updated in the same transaction. The operation begins by calling the getSavedOptCounterInfo (key) method to obtain the OptCounterInfo instance for the specified row (step 602). Then the operation constructs an SQL UPDATE statement that updates the specified row using the string returned by the getIncrementOptCounterFragment( ) OptCounterInfo class method to construct part of the SQL UPDATE statement so that it increments the OPTCOUNTER column value, and appends the string returned by the getWhereClauseFragment( ) method of the OptCounterInfo instance to the WHERE clause of the SQL UPDATE statement (step 604). Then the operation prepares the SQL UPDATE statement (step 606). The operations sets any required parameter information for parameter markers, except for those parameter markers introduced by the string returned by the getWhereClauseFragment( ) method of the OptCounterInfo instance, in the prepared SQL UPDATE statement (step 608). Next, the operation calls the setParameter(preparedStatement, index) method of the OptCounterInfo instance specifying one more than the number of parameter markers set in the previous step (step 610). Then the operation executes the prepared SQL UPDATE statement (step 612). The operation determines if the row was updated (step 614). If the row was updated (a yes output to step 614), the operation calls the increment( ) method of the OptCounterInfo instance (step 616) and the operation ends. Otherwise, if the row was not updated (a no output to step 614), then the operation determines if the result from the getWhereClauseFragment( ) method is an empty string (step 618). If the result from the getWhereClauseFragment( ) method was not an empty string (a no output to step 618), then the operation throws an exception indicating that the transaction should be rolled back and that appropriate recovery action, such as retrying the same transaction, should be executed (step 620) and the operation ends. If the result from the getWhereClauseFragment( ) method is an empty string (a yes output to step 618), then the operation ends.

Figure 7:
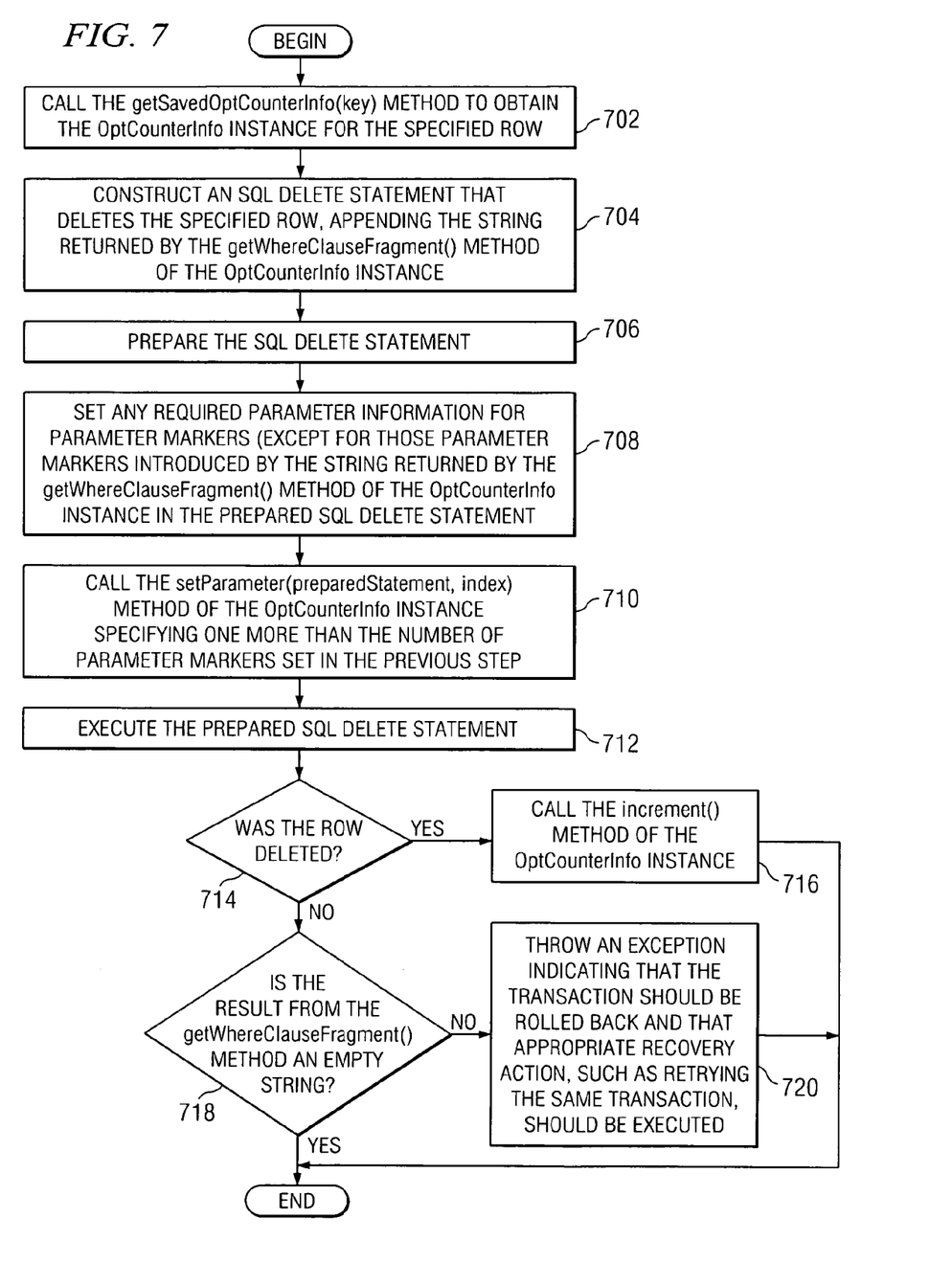
FIG. 7 is a flowchart illustrating a method to construct and execute an Optimistic DELETE statement, in accordance with an exemplary embodiment of the present invention.

FIG. 7 is a flowchart illustrating a method to construct and execute an Optimistic DELETE statement, in accordance with an exemplary embodiment of the present invention. An Optimistic DELETE statement deletes a single row and fails if the OPTCOUNTER value has changed since the row was most recently read or updated in the same transaction. The operation begins by calling the getSavedOptCounterInfo (key) method to obtain the OptCounterInfo instance for the specified row (step 702). The operation constructs an SQL DELETE statement that deletes the specified row, appending the string returned by the getWhereClauseFragment( ) method of the OptCounterInfo instance (step 704). Then the operation prepares the SQL DELETE statement (step 706). The operations sets any required parameter information for parameter markers, except for those parameter markers introduced by the string returned by the getWhereClauseFragment( ) method of the OptCounterInfo instance, in the prepared SQL DELETE statement (step 708). Next, the operation calls the setParameter(preparedStatement, index) method of the OptCounterInfo instance specifying one more than the number of parameter markers set in the previous step (step 710). Then the operation executes the prepared SQL DELETE statement (step 712). The operation determines if the row was deleted (step 714). If the row was deleted (a yes output to step 714), the operation calls the increment( ) method of the OptCounterInfo instance (step 716) and the operation ends. Otherwise, if the row was not deleted (a no output to step 714), then the operation determines if the result from the getWhereClauseFragment( ) method is an empty string (step 718). If the result from the getWhereClauseFragment( ) method was not an empty string (a no output to step 718), then the operation throws an exception indicating that the transaction should be rolled back and that appropriate recovery action, such as retrying the same transaction, should be executed (step 720) and the operation ends. If the result from the getWhereClauseFragment( ) method is an empty string (a yes output to step 718), then the operation ends.

Figure 8:
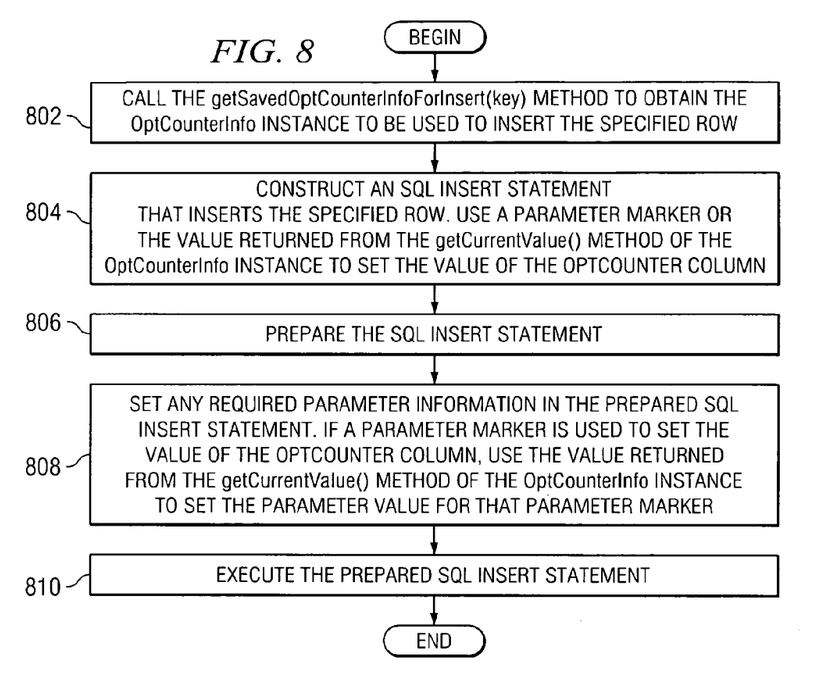
FIG. 8 is a flowchart illustrating a method to construct and execute an Optimistic INSERT statement, in accordance with an exemplary embodiment of the present invention.

FIG. 8 is a flowchart illustrating a method to construct and execute an Optimistic INSERT statement, in accordance with an exemplary embodiment of the present invention. An Optimistic INSERT statement inserts a single row specifying an appropriate value for the OPTCOUNTER column. The value to be inserted is the value that was most recently read or updated in the same transaction, otherwise a random value is assigned. The method begins by calling the getSavedOptCounterInfoForInsert(key) method to obtain the OptCounterInfo instance to be used to insert the specified row (step 802). The getSavedOptCounterInfoForInsert(key) method returns the instance that would be returned by a call to the getSavedOptCounterInfo(key) method, but additionally calls the increment( ) method if the Known property is true, or otherwise calls the randomize( ) method if the Known property is false. The operation constructs an SQL INSERT statement that inserts the specified row, using a parameter marker or the value returned from the getCurrentValue( ) method of the OptCounterInfo instance to set the value of the OPTCOUNTER column (step 804). Then the operation prepares the SQL INSERT statement (step 806). The operation sets any required parameter information in the prepared SQL INSERT statement. If a parameter marker is used to set the value of the OPTCOUNTER column, then the operation uses the value returned from the getCurrentValue( ) method of the OptCounterInfo instance to set the parameter value for that parameter marker (step 808). Then the operation executes the prepared SQL INSERT statement (step 810) and the operation ends.

Optimistic Locking for Java™ entity beans uses a combination of Container Managed Persistence (CMP) and Java™ Database Connectivity (JDBC) session beans. An enterprise bean that represents persistent data maintained in a database. An entity bean can manage its own persistence or it can delegate this function to its container. An entity bean is identified by a primary key. If the container in which an entity bean is hosted crashes, the entity bean, its primary key, and any remote references survive the crash. A session enterprise bean models a connection, or session, with a single client. Session beans persist only for the life of the connection with the client. If the EJB server crashes, the session bean dies. CMP occurs when the entity object delegates persistence services. With CMP, the Enterprise JavaBeans™ container transparently and implicitly manages the persistent state. J2EE platforms, such as IBM WebSphere, can provide CMP for Java™ entity beans, whereby the container persistence layer calls entity bean methods such as ejbCreate, when the persistent entity bean is about to be created in the database, ejbLoad, when the persistent entity bean has been loaded from the database, ejbStore, when the entity bean is about to be saved in the database, and ejbRemove, when the persistent entity bean is about to be deleted from the database, to manage the life cycle of entity beans.

The OPTCOUNTER column of the database table is represented in each entity bean as an entity bean attribute called OptCounter. However, the OptCounter attribute does not need to be exposed to or used by the application business logic, since its only use is in constructing SQL statements that implement optimistic locking.

A container such as the WebSphere entity bean container that implements optimistic locking, may be configured in such a way that the SQL UPDATE and DELETE statements it executes include in the WHERE clause the OPTCOUNTER value that was read when the entity bean was loaded. However, the SQL UPDATE statements that it executes must also increment the OPTCOUNTER value. To achieve this, the OptCounter attribute value can be incremented in the ejbStore method, when it is called to indicate that the entity bean is about to be saved in the database. The incremented value is saved in the map maintained by the OptCounterInfo class, mapped by the unique key for the entity bean.

A container such as the WebSphere entity bean container maintains entity bean attributes in memory, and normally does not persist them to the database until just before the current database transaction is about to be committed. However, it can provide a flush method to persist all changed entity beans to the database without waiting for the transaction to commit. JDBC session beans that construct their SQL statements to use the OPTCOUNTER column for optimistic locking rely on the current value of the OPTCOUNTER column being up to date in the database. Therefore the container flush method must be called before such JDBC session beans execute their SQL statements.

To achieve this, exemplary embodiments of the present invention provide additional methods to determine whether a call to the flush method is required. Each OptCounterInfo instance contains an additional boolean property called EjbLoaded, which is set to true in the entity bean ejbLoad method when the entity bean has been loaded. Additional JDBC session bean methods called getSavedOptCounterInfoForOptimisticSelect(key), getSavedOptCounterInfoForUpdate(key), and getSavedOptCounterInfoForDelete(key) are provided. These additional methods have a common implementation, which, given a unique key for the corresponding entity bean, calls the OptCounterInfo.getSavedOptCounterInfo(key) method to obtain the OptCounterInfo instance, which is returned, and calls the session bean flush method only if the OptCounterInfo EjbLoaded property of the returned OptCounterInfo instance is true. A similar getSavedOptCounterInfoForInsert(key) method would also be required if the container delayed entity bean deletion until the database transaction was committed, but this is not the case for the WebSphere entity bean container.

When an entity bean is created in the database, the ejbCreate entity bean method calls the getSavedOptCounterInfoForInsert(key) method to obtain the OptCounterInfo instance for the new entity bean instance. As discussed previously, this is important so that in the case where the same entity bean has been previously deleted in the same transaction, the inserted OPTCOUNTER value is the previously existing value, incremented, so that when the transaction completes, it appears as if an UPDATE has occurred. Each OptCounterInfo instance has a setCurrentValue(value) method which sets the Value property to the specified value, and sets the Known property to true.

Figure 9:
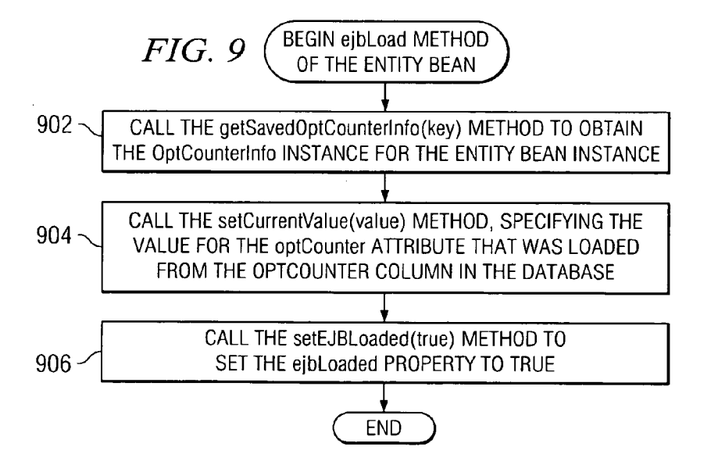
FIG. 9 is a flowchart illustrating a method to remember the OPTCOUNTER value when an entity bean is loaded, in accordance with an exemplary embodiment of the present invention.

FIG. 9 is a flowchart illustrating a method to remember the OPTCOUNTER value when an entity bean is loaded, in accordance with an exemplary embodiment of the present invention. In the ejbLoad method of the entity bean, the operation begins by calling the getSavedOptCounterInfo(key) method to obtain the OptCounterInfo instance for the entity bean instance (step 902). The operation calls the setCurrentValue(value) method, specifying the value for the OptCounter attribute that was loaded from the OPTCOUNTER column in the database (step 904). Then the operations calls the setEJBLoaded(true) method to set the ejbLoaded property to true (step 906) and the operation ends.

Figure 10:
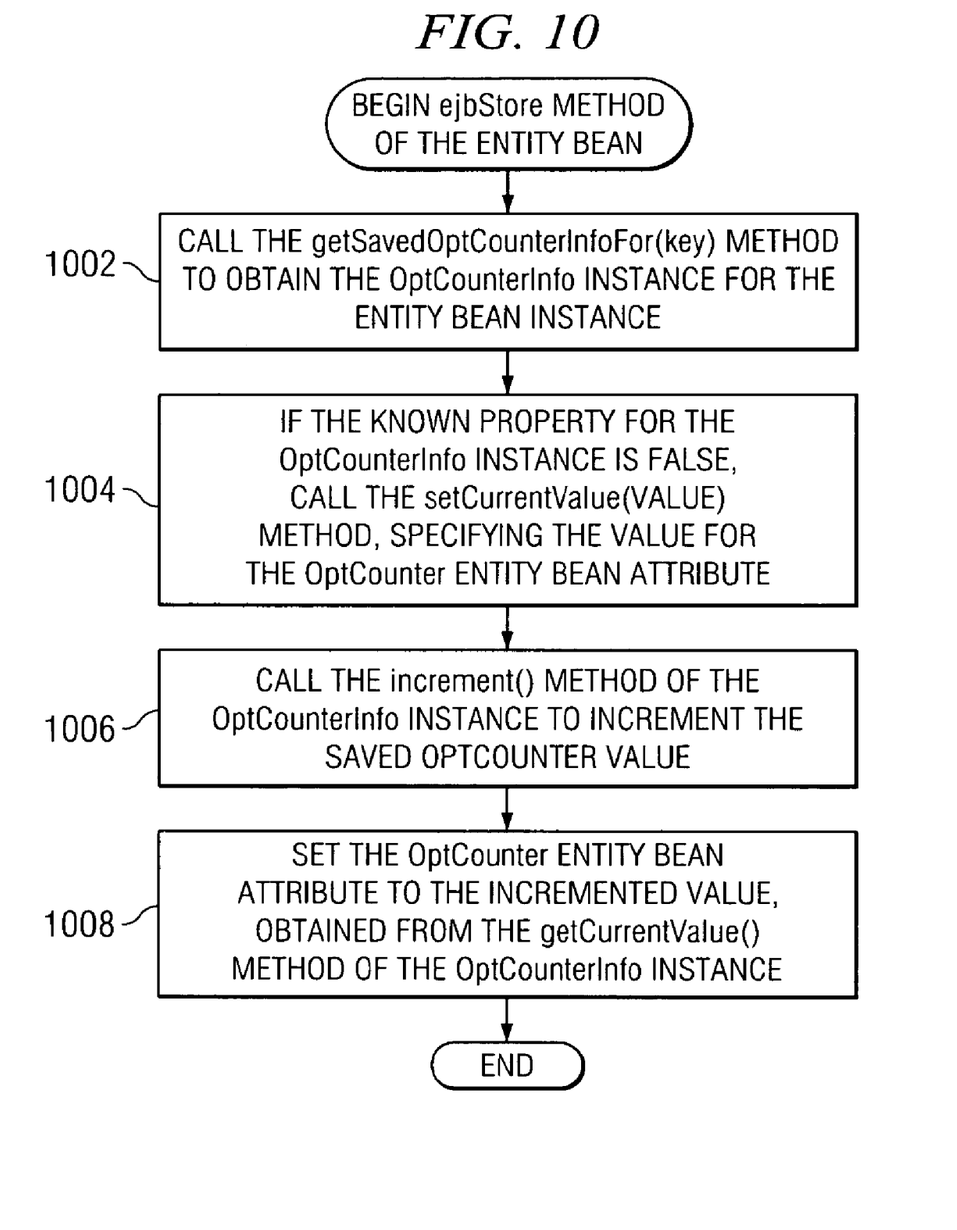
FIG. 10 is a flowchart illustrating a method to increment the OPTCOUNTER value when an entity bean is stored in accordance with an exemplary embodiment of the present invention.

FIG. 10 is a flowchart illustrating a method to increment the OPTCOUNTER value when an entity bean is stored, in accordance with an exemplary embodiment of the present invention. In the ejbStore method of the entity bean, the operation begins by calling the getSavedOptCounterInfo(key) method to obtain the OptCounterInfo instance for the entity bean instance (Step 1002). If the Known property for the OptCounterInfo instance is false, the operation calls the setCurrentValue(value) method, specifying the value for the OptCounter entity bean attribute (step 1004). The operation calls the increment( ) method of the OptCounterInfo instance to increment the saved OPTCOUNTER value (step 1006). Next, the operation sets the OptCounter entity bean attribute to the incremented value, obtained from the getCurrentValue( ) method of the OptCounterInfo instance (step 1008) and the operation ends.

Figure 11:
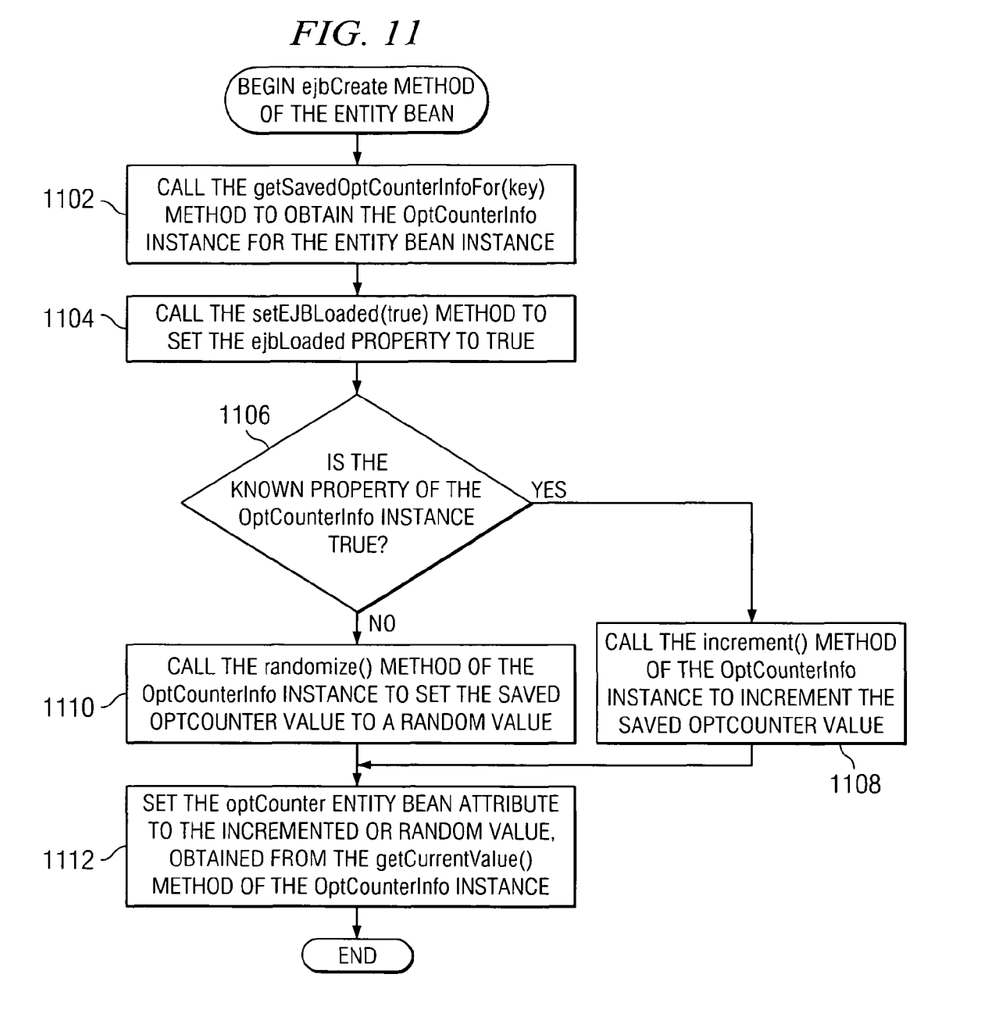
FIG. 11 is a flowchart illustrating a method to set the OptCounter entity bean attribute value when an entity bean is created in accordance with an exemplary embodiment of the present invention.

FIG. 11 is a flowchart illustrating a method to set the OptCounter entity bean attribute value when an entity bean is created in accordance with an exemplary embodiment of the present invention. In the ejbCreate method, the operation begins by calling the getSavedOptCounterInfo(key) method to obtain the OptCounterInfo instance for the entity bean instance (step 1102). The operation calls the setEJBLoaded (true) method to set the ejbLoaded property to true (step 1104). The operation determines if the Known property of the OptCounterInfo instance is true (step 1106). If the Known property of the OptCounterInfo instance is true (a yes output to step 1106), the operation calls the increment( ) method of the OptCounterInfo instance to increment the saved OPT-COUNTER value (step 1108). Otherwise, if the Known property of the OptCounterInfo instance is false (a no output to step 1106), the operation calls the randomize( ) method of the OptCounterInfo instance to set the saved OPTCOUNTER value to a random value (step 1110). Then the operation sets the OptCounter entity bean attribute to the incremented or random value, obtained from the getCurrentValue( ) method of the OptCounterInfo instance (step 1112) and the operation ends.

A method to flush changed container Managed entity beans prior to executing JDBC session bean methods that require the current OPTCOUNTER value to be in the database is an alteration to the previously described methods for constructing Optimistic SQL statements. When constructing an Optimistic SELECT, UPDATE, INSERT, or DELETE SQL statement, after obtaining the OptCounterInfo instance in steps 402, 502, 602, 702, and 802 of FIGS. 4, 5, 6, 7, and 8, respectively, perform the following step: "If the EjbLoaded property of the OptCounterInfo instance is true, the operation calls the entity bean container flush method."

Thus, the present invention provides a computer implemented method, data processing system, and computer program product for optimistic locking using SQL SELECT, UPDATE, DELETE, and INSERT statements.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing optimistic locking in a database containing a plurality of data records, comprising:
   providing a variable optimistic locking value for each data record;
   deleting a data record identified by a first key during a database transaction;
   storing a current value of the optimistic locking value of the deleted data record during the database transaction;
   during the same database transaction, inserting a data record identified by a second key;
   when the second key is the same as the first key, setting the optimistic locking value for the inserted record to the stored current value of the optimistic locking value of the deleted data record as changed by a set amount; and
   when the second key is not the same as the first key, setting the optimistic locking value for the inserted record to a random value.

2. The method of claim 1, wherein the optimistic locking value is an integer value and wherein setting the optimistic locking value for the inserted record to the stored current value of the optimistic locking value of the deleted data record as changed by a set amount includes changing the stored current value of the optimistic locking value of the deleted data record by incrementing the stored current optimistic locking value of the deleted data record.

3. A computer program product comprising a computer readable apparatus including computer usable program code stored thereon for controlling a computer to provide optimistic locking in a database containing a plurality of data records including a variable optimistic locking value for each data record, comprising:
   computer usable program code for deleting a data record identified by a first key during a database transaction;
   computer usable program code for storing a current value of the optimistic locking value of the deleted data record during the database transaction;
   computer usable program code for, during the same database transaction, inserting a data record identified by a second key;
   computer usable program code for, when the second key is the same as the first key, setting the optimistic locking value for the inserted record to the stored current value of the optimistic locking value of the deleted data record as changed by a set amount; and
   computer usable program code for, when the second key is not the same as the first key, setting the optimistic locking value for the inserted record to a random value.

4. The computer program product of claim 3, wherein the optimistic locking value is an integer value and wherein the computer usable program code for setting the optimistic locking value for the inserted record to the stored current value of the optimistic locking value of the deleted data record as changed by a set amount includes computer usable program code for changing the stored current value of the optimistic locking value of the deleted data record by incrementing the stored current optimistic locking value of the deleted data record.

5. A data processing system for optimistic locking, comprising:
   a database containing a plurality of data records including a variable optimistic locking value for each data record; and
   a processor coupled to the database and adapted to
     delete a data record identified by a first key during a database transaction,
     store a current value of the optimistic locking value of the deleted data record during the database transaction,
     during the same database transaction, insert a data record identified by a second key,
     when the second key is the same as the first key, set the optimistic locking value for the inserted record to the stored current value of the optimistic locking value of the deleted data record as changed by a set amount, and when the second key is not the same as the first key, set the optimistic locking value for the inserted record to a random value.

6. The data processing system of claim 5, wherein the optimistic locking value is an integer value and wherein the processor is adapted to set the optimistic locking value for the inserted record to the stored current value of the optimistic locking value of the deleted data record as changed by a set amount by changing the stored current value of the optimistic locking value of the deleted data record by incrementing the stored current optimistic locking value of the deleted data record.

* * * * *